United States Patent
Reddy et al.

(10) Patent No.: US 6,574,619 B1
(45) Date of Patent: Jun. 3, 2003

(54) SYSTEM AND METHOD FOR PROVIDING CROSS-DIMENSIONAL COMPUTATION AND DATA ACCESS IN AN ON-LINE ANALYTICAL PROCESSING (OLAP) ENVIRONMENT

(75) Inventors: Venugopal P. Reddy, Madison, NJ (US); Harmindar S. Matharu, Lake Hiawatha, NJ (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/535,905

(22) Filed: Mar. 24, 2000

(51) Int. Cl.[7] .............................................. G06R 17/30
(52) U.S. Cl. ........................................ 707/2; 707/102
(58) Field of Search ............................ 707/2, 100, 102, 707/103, 10

(56) References Cited

U.S. PATENT DOCUMENTS

| | | | |
|---|---|---|---|
| 5,359,724 A | | 10/1994 | Earle ........................... 395/425 |
| 6,122,636 A | * | 9/2000 | Malloy et al. ............... 707/102 |
| 6,317,750 B1 | * | 11/2001 | Tortolani et al. ........... 707/103 |
| 6,374,234 B1 | * | 4/2002 | Netz .............................. 707/2 |
| 6,381,605 B1 | * | 4/2002 | Kothuri et al. ............. 707/100 |
| 6,408,292 B1 | * | 6/2002 | Bakalash et al. .............. 707/2 |

OTHER PUBLICATIONS i2 Technologies, "Demand Planning Solutions" http://www.82.com/html/i2_solutions_for_demand_planning.html, 3 pages, Dec. 28, 1998.

* cited by examiner

Primary Examiner—Diane D. Mizrahi
(74) Attorney, Agent, or Firm—Baker Botts L.L.P.

(57) ABSTRACT

A system for generating a value for a first attribute includes a database having one or more dimensions that each include one or more members. The database includes one or more storage locations that are each associated with one member from each dimension in a set of one or more of the dimensions. A server evaluates an expression including at least one second attribute that depends on a set of one or more of the dimensions, the expression mapping at least one member of a first dimension on which the first attribute depends to at least one member of a second dimension on which the second attribute depends. The value for the first attribute is generated according to the expression. The server and database may operate in an on-line analytical processing (OLAP) environment.

59 Claims, 3 Drawing Sheets

| MAPPING SET 1 | |
|---|---|
| SOURCE | TARGET |
| 96MB  *32* | 13GB  *32* |
| 128MB *32* | 13GB  *32* |
| 96MB  *32* | 8GB   *32* |
| 128MB *32* | 8GB   *32* |
| HOME  *32* | 533MHz *32* |
| STUDENT *32* | 533MHz *32* |
| HOME  *32* | 700MHz *32* |
| STUDENT *32* | 700MHz *32* |
| . . . | . . . |

US 6,574,619 B1

SYSTEM AND METHOD FOR PROVIDING CROSS-DIMENSIONAL COMPUTATION AND DATA ACCESS IN AN ON-LINE ANALYTICAL PROCESSING (OLAP) ENVIRONMENT

RELATED APPLICATIONS

This Application is related to U.S. application Ser. No. 09/241,361, filed Jan. 29, 1999 and now U.S. Pat. No. 6,442,554 by Venugopal P. Reddy, Daniel J. Folmar, Milind S. Gupte, and Usha B. Iyer, for a System and Method for Generating Dependent Data.

TECHNICAL FIELD OF THE INVENTION

This invention relates in general to the field of data processing and in particular to a system and method for providing cross-dimensional computation and data access in an on-line-analytical processing (OLAP) environment.

BACKGROUND OF THE INVENTION

It is often desirable in business or other planning environments to perform on-line analytical processing (OLAP) computations to generate desired data. For example, it may be desirable to compute the value of a Revenue data measure, according to the expression Revenue=Units*Price. Given a set of positions in a multi-dimensional database, this expression yields a value for the Revenue data measure according to the values of Units and Price for that set of positions. More generally, the value of a data measure (whether the value is stored in the database or computed at run-time) varies according to the particular combination of positions for which the data measure is being evaluated. A data measure depends on a dimension if a change of position in that dimension may change the value of the data measure.

With existing OLAP systems, data access is limited to the positions at which the data measure is being computed—no cross-dimensional access is provided to data associated with other positions. Furthermore, the data measures for which a value is being computed must depend on the same dimensions as other data measures in the expression—the data measure being computed cannot depend on a dimension that is not depended on by at least one other data measure in the expression. As a result, these OLAP systems are unable to compute values for a variety of more sophisticated "virtual" data measures for which the database lacks persistent storage and which must thus be computed at run-time. These and other disadvantages make previous OLAP systems inadequate for many purposes.

SUMMARY OF THE INVENTION

According to the present invention, disadvantages and problems associated with systems for generating data in on-line analytical processing (OLAP) environments have been substantially reduced or eliminated.

According to one embodiment of the present invention, a system for generating a value for a first attribute includes a database having one or more dimensions each including one or more members. The database includes one or more storage locations that are each associated with one member from each dimension in a set of one or more of the dimensions. A server evaluates an expression including at least one second attribute that depends on a set of one or more of the dimensions, the expression mapping at least one member of a first dimension on which the first attribute depends to at least one member of a second dimension on which the second attribute depends. The value for the first attribute is then generated according to the expression. In a more particular embodiment, the server and database operate in an on-line analytical processing (OLAP) environment. In other more particular embodiments, the first and second dimensions are aliases of at least one base dimension, the value for the first attribute is generated using cross-dimensional computation according to the mapping, and a value for the second attribute is generated using cross-dimensional data access according to the mapping.

The system and method of the present invention provide a number of important technical advantages. Unlike previous techniques, the system and method of the present invention provide cross-dimensional data access to positions other than those at which the data measure is being computed. Like at least some existing systems, the present invention allows values to be computed for "virtual" data measures lacking persistent storage in the database. However, unlike previous techniques, the system and method of the present invention provide for cross-dimensional computation, such that a value may be computed for a virtual data measure that depends on one or more different dimensions than the other data measures in an associated computational expression. Using dimension aliases and appropriate mappings, the present invention provides these and other important benefits relative to existing OLAP systems. Other important technical advantages are apparent to those skilled in the art from the following figures, description, and claims.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
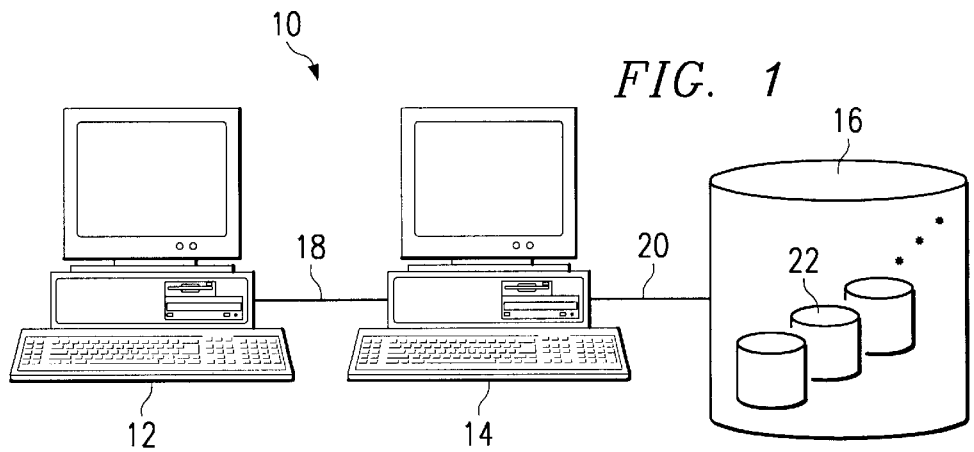
FIG. 1 illustrates an exemplary system providing cross-dimensional computation and data access in an on-line analytical processing (OLAP) environment.

FIG. 1 illustrates an exemplary system 10 for providing cross-dimensional computation and data access in an on-line analytical processing (OLAP) or other suitable environment. System 10 may provide cross-dimensional computation and data access for any suitable purpose, for example only and not by way of limitation, statistical modeling, a profit or other financial computation, a dependent demand forecast or other supply chain planning computation, or any other suitable purpose. Although existing OLAP systems provide computations involving data measures, system 10 supports virtual data measures, according to the present invention, to enhance such traditional capabilities. Employing the concepts of dimension aliases and dimension member mapping, system 10 provides cross-dimensional data access—the ability to access data at positions different from the currently selected positions, for example, those at which a data measure is being computed. System 10 also provides for cross-dimensional computation—allowing a value to be computed for a data measure that depends on one or more different dimensions than other data measures in an associated computational expression. System 10 thus provides important technical advantages over existing OLAP systems.

System 10 includes a client 12, a server 14, and a multi-dimensional engine and associated database 16. Client 12 and server 14 may each support one or more processes operating on one or more computers, and may be autonomous or operate subject to input from one or more users. Client 12 is coupled to the server 14 using link 18, which may be any wired, wireless, or other link suitable to support communications between client 12, server 14, and the respective processes of server 12 and client 14 during the operation of system 10. Although client 12 and server 14 are described as separate components, the present invention contemplates client 12 and server 14 integral to or separate from one another.

Server 14 is coupled to database 16 using link 20, which may be any wired, wireless, or other link suitable to support data communications between server 14 and database 16 during the operation of system 10. Database 16 may be integral to or separate from server 14, may operate on one or more computers at one or more locations, and may store any information suitable to support operation of system 10. In one embodiment, database 16 provides storage for multi-dimensional OLAP data and may be populated with data received from transactional data sources that are internal or external to the organization or facility associated with system 10. In one embodiment, server 14 receives input from client 12 to define instances of data measures, expressions, mappings, aggregation functions, and any other suitable information to be stored in database 16. Server 14 may cooperate with client 12 in any appropriate manner to populate database 16 with information, modify the contents of database 16, or retrieve information from database 16 according to the operation of system 10 and particular needs.

Figure 2:
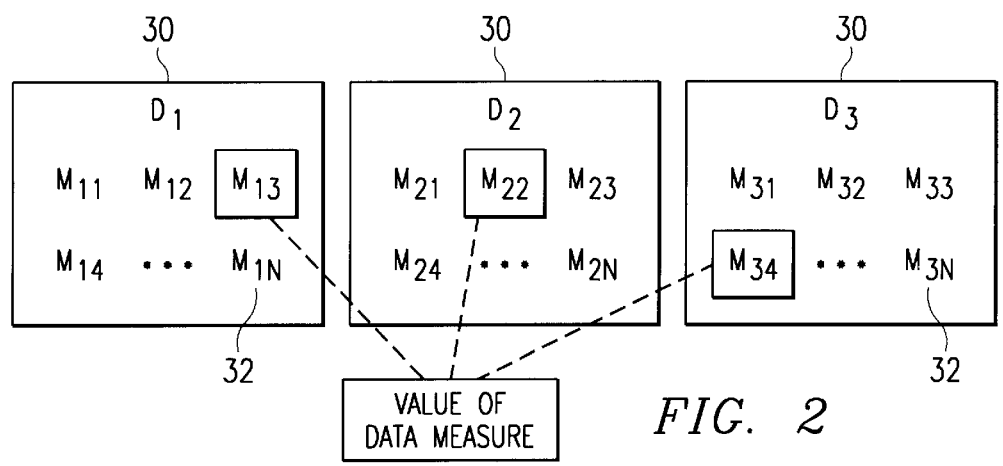
FIG. 2 illustrates an exemplary relationship between a set of dimension members and the value of a data measure.

Database 16 includes one or more dimensions. As illustrated in FIG. 2 for an exemplary three-dimensional database 16, a dimension 30 is a logical grouping of one or more entities referred to as the members 32 of dimension 30. Within dimension 30, members 32 may be partitioned into one or more levels. A data measure is an attribute whose value depends upon at least one position in each of one or more dimensions 30; that is, one or more particular members 32 at which that data measure is being evaluated. The set of dimensions 30 on which a data measure depends is referred to as the dimensionality of the data measure. For each set of members 32 from dimensions 30 on which a data measure depends, database 16 includes a corresponding storage location 22 containing the values of one or more data measures for those members 32. In other words, for each data measure represented in database 16, server 14 associates with each storage location 22 a member 32 from each of dimension 30 on which the data measure depends (from each dimension 30 in its dimensionality). A data measure yields a scalar value at an intersection (combined set of members 32) of its dependent dimensions 30. When a combination of members 32 is specified, server 14 accesses the storage location 22 associated with that combination of members 32 to manipulate the data at that storage location 22 or provide server 14 with requested information.

For example, referring to FIG. 2, a data measure may have dimensionality $\{D_1, D_2, D_3\}$ (meaning the data measure depends on the $D_1$, $D_2$, and $D_3$ dimensions 30). The value of the data measure is determined according at least one position in each of these dimensions 30; that is, the particular set of members 32 at which the data measure is to be evaluated. In a particular example, the data measure may be evaluated at the combination of $M_{13}$ member 32 of dimension $D_1$, $M_{22}$ member 32 of dimension $D_2$, and $M_{34}$ member 32 of dimension $D_3$. The value of the data measure for this set of members 32 is associated with a particular storage location 22 in database 16, possibly along with values of other data measures for that set of members 32. In one embodiment, database 16 provides persistent storage for each value of each data measure.

As a more concrete example, Unit Sales may be an exemplary data measure that depends on a single member 32 from each of the following three dimensions 30: product dimension 30, geography dimension 30, and time dimension 30. Each combination of members 32 of the dimensions 30 has, for the Unit Sales data measure, a corresponding storage location 22 in database 16, similar to each combination of coordinates on the x, y, and z axes being associated with a point in three-dimensional Euclidean space. Two data measures need not have the same dimensionality. As an example, in contrast to the Unit Sales data measure discussed above, an exemplary Price data measure may be associated with product and time dimensions 30, but not geography dimension 30. Furthermore, position within a particular dimension 30 may be changed independent of members 32 of other dimensions 30, much like the position of a coordinate on the x axis may be changed independent of positions of other coordinates on the y and z axes in three-dimensional Euclidean space.

Figure 3:
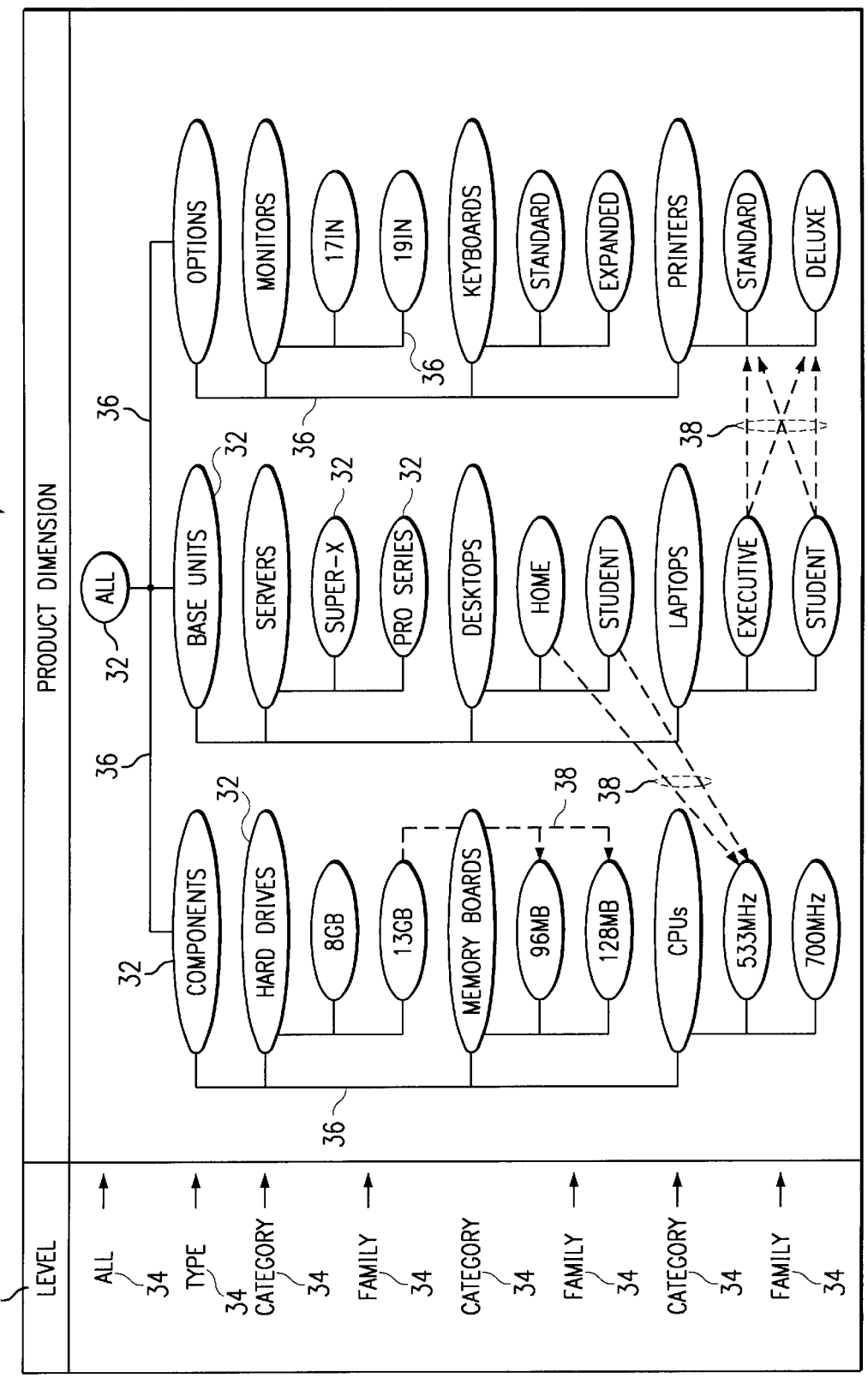
FIG. 3 illustrates an exemplary product dimension.

FIG. 3 illustrates an exemplary product dimension 30 within database 16 that includes a hierarchy of product levels 34 each having one or more members 32. The value of a data measure for a member 32 is, at least in one embodiment, an aggregation of values of that data measure for hierarchically related members 32 in lower levels 34. Exemplary hierarchical relationships between members 32 in levels 34 are shown using links 36. The links 36 between hierarchically related members 32 in adjacent levels 34 reflect parent-child relationships and are shown as solid lines. Exemplary levels 34 for product dimension 30 include an all products level 34, a product type level 34, a product category level 34, and a product family level 34, although any suitable levels 34 may be provided according to the particular needs of the organization or other entity associated with system 10. Furthermore, this description applies analogously to one or more other dimensions 30 in database 16, for example, a geography dimension 30, a time dimension 30, or any other suitable dimensions 30, instead of or in addition to product dimension 30.

As discussed more fully below, system 10 may generate dependent data (such as a dependent demand forecast) for any target product member 32 in product dimension 30 as a function of corresponding data for any source product member 32 in product dimension 30, whether or not the source and target product members 32 are hierarchically related. Such dependent data relationships between hierarchically unrelated members 32 are shown in FIG. 3 using dashed links 38. For example, in one embodiment, link 38 between "13 gb" member 32 in family level 34 and "96 mb" member 32 also in family level 34 indicates a dependent demand relationship between "13 gb" member 32 and "96 mb" member 32. As indicated by the direction of the arrow on link 38, the demand for 96 mb memory boards (target product) is in this example a function of the demand for 13 gb hard drives (source product) and may be expressed as an appropriate attach rate.

Figure 4:
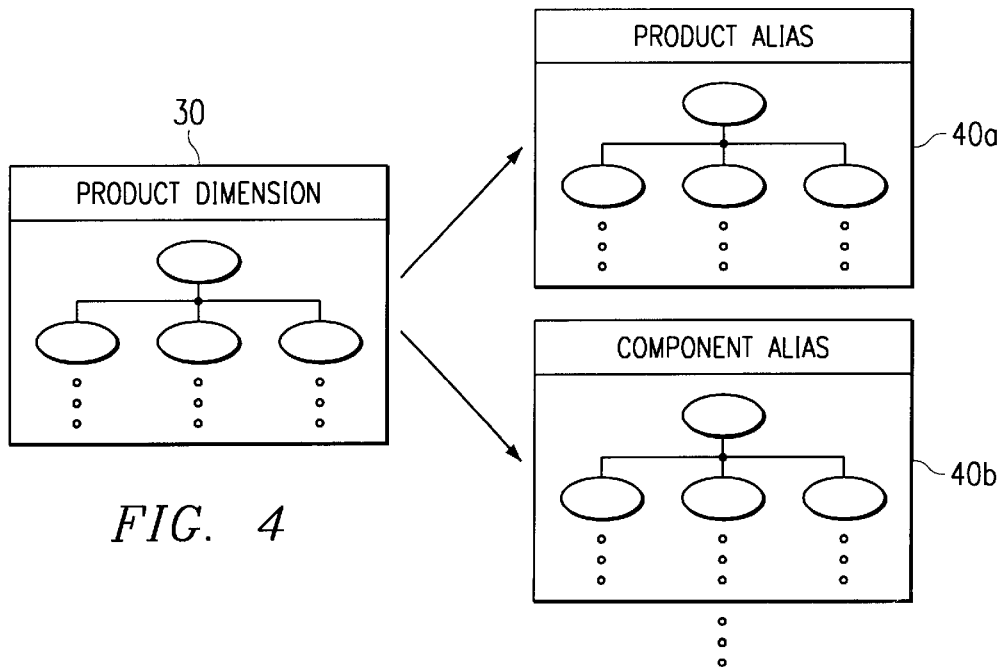
FIG. 4 illustrates exemplary dimension aliases.

In one embodiment each dimension 30 in database 16 may have one or more aliases (also referred to as its identities). FIG. 4 illustrates two exemplary aliases of product dimension 30, product alias 40*a* and component alias 40*b*. Aliases may be referred to singly as alias 40 and collectively as aliases 40, as appropriate. Product alias 40*a* may be an alias of product dimension 30 since members 32 of product alias 40*a* are, in this example, the same as members 32 of product dimension 30. Component alias 40*b* may be an alias of product dimension 30 since members 32 of component alias 40*b* may also be members 32 of product dimension 30. For example, a "Hard Drive" member 32 of component alias 40*b* may also be a member 32 of product alias 40*a*, consistent with the business reality that hard drives may typically be sold as separate products or as components of various bundled computer products.

Each alias 40 of dimension 30 is treated as an orthogonal dimension 30 relative to other aliases 40 of that dimension 30 and is thus independent of the other aliases 40 with respect to data access, navigation, and other appropriate activities. In other words, changing positions (from a current member 32 to a new member 32) in an alias 40 is independent of the other aliases 40, and all aliases 40 are treated as equal (there is no "master" alias 40). Database 16, server 14, and any other suitable components of system 10 are aware of the multiple aliases 40 of dimension 30 and may make use of this in certain situations. For purposes of this description, where appropriate, use of the term "dimension" refers to the underlying or base dimension 30 and use of the term "alias" refers to one or more of the aliases 40 of that dimension 30 unless specified otherwise.

Data measures are multi-dimensional attributes and may depend on a subset of aliases 40. In one embodiment, aliases 40 rather than the base dimensions 30 are used to define data measure dimensionality (dimensions 30 on which the data measure depends). For example only, and without limitation, Product Demand may be a data measure that depends on combined positions in product, geography, and time dimensions 30 {product, geography, time} dimensionality. Component Demand might be a data measure having {component, geography, time} dimensionality. The dependent relationship between demand for a target product and demand for a source product may be expressed numerically as an attach rate applied to the demand for the source product. An Attach Rate data measure may thus have {product, component, geography, time} dimensionality, since it depends on both product alias 40*a* and component alias 40*b*. A data measure yields a different value for a different position in an alias 40 if and only if the data measure depends on the alias 40. In other words, if position changes in an alias 40, the value of a data measure will not change if the data measure is independent of alias 40 with the position change. In this example, changing the position in component alias 40*b* does not change the value of the Product Demand data measure, since that data measure is not dependent upon component alias 40*b* (as indicated in its dimensionality).

According to the present invention, virtual data measures behave like other data measures, but do not have associated persistent data storage in database 16. The value of such a virtual data measure may therefore, in one embodiment, be computed or otherwise generated at run-time in response to a request or other suitable input from server 14. An expression, in terms of one or more data measures, one or more unary, binary, or other operators, one or more constants, one or more scripts (described below), and even one or more other virtual data measures, is associated with each virtual data measure and used to compute a value for the virtual data measure given a position in each of the aliases 40 on which the virtual data measure depends. As an example, a relatively simple virtual data measure, Revenue, may have the associated expression:

Revenue=Units*Price

This expression is supported in most existing OLAP systems.

In contrast, and according to the present invention, the data measures used in an expression for a virtual data measure may have different dimensionality. An appropriate mapping (described below) may be used to convert the dimensionality of a source data measure to the dimensionality of a target data measure or target virtual data measure. For each alias 40 on which a source data measure depends (source alias 40) that does not match at least one alias 40 on which a target data measure or target virtual data measure depends (target alias 40), the members 32 of at least one target alias 40 need to be mapped to the members 32 of the source alias 40.

Given members 32 for an intersection of a first set of aliases 40, the mapping yields zero or more members 32 for an intersection of a second set of aliases 40. As discussed above with reference to FIG. 2, such an intersection may include multiple members 32 from a particular dimension 30. A mapping between members 32 of the same alias 40 can be defined as an identity mapping (each member 32 is mapped to itself), a relative mapping (each member 32 in a level of dimension 30 is mapped to another member 32 in the same or a different level of that dimension 30), or any other suitable mappings. As described more fully below, an aggregation function may be used when a single target member 32 in a target alias 40 is to be mapped to multiple source members 32 in a source alias 40.

In one embodiment, one or more mapping sets may be used to specify mappings between members 32 of one or more aliases 40, according to particular needs. A mapping set is a subset of members 32 selected from a set of one or more aliases 40 containing the selected members 32. A mapping set may be used to specify mappings between members 32 or to define the scope of display, update, or any other suitable activity associated with database 16. In one embodiment, a mapping set may be defined either by selecting or otherwise specifying its members 32 or by specifying an expression on one or more data measures having the same dimensionality (dependent on the same set of aliases 40). If an expression is used to define a mapping set, some additional information may be needed to generate the members 32 of the mapping set. As an example, a mapping set defining the range between the start of a year and the current week would require the current week as input before member 32 can be generated.

To further illustrate the concept of mapping sets, assume Component Demand is a virtual data measure having the associated expression:

Component Demand=Sum[Mapping:Component-to-Product](Product Demand*Attach Rate)

The mapping Component-to-Product may rely on a mapping set relating members 32 of product alias 40*a* to members 32 of component alias 40*b*, as described below. Given a particular component member 32, particular geography member 32, and particular time member 32, the above: (1) determines a product demand data measure for each product incorporating the component (at the intersection of the appropriate product member 32, geography member 32, and time member 32); (2) applies an attach rate data measure (at the intersection of product member 32, component member 32, geography member 32, and time member 32) to each product demand to determine the dependent demand for the component that is attributable to each product; and (3) applies a sum aggregation function to these dependent demands to yield the total dependent demand for that component. The mapping in this example specifies which products incorporate the component. A value is generated for the component demand virtual data measure, either at run-time or otherwise, without requiring persistent storage in database 16 for that value. This is merely an exemplary use of an expression including a mapping to generate a value for a virtual data measure. The present invention is intended to encompass all appropriate expressions, mappings, and associated virtual measure computations.

Figures 5, 6:
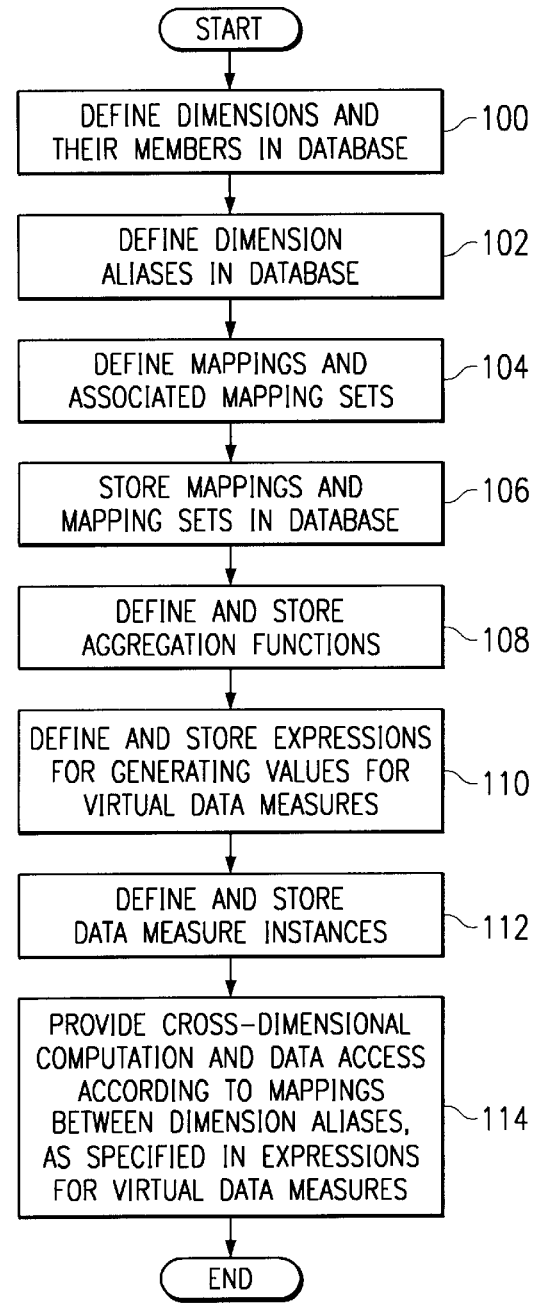
FIG. 5 illustrates an exemplary mapping set.
FIG. 6 is a flow chart illustrating an exemplary method of providing cross-dimensional computation and data access in an OLAP environment.

FIG. 5 illustrates an exemplary mapping set 42 corresponding to a product dimension 30 and which might be used in generating the values for virtual data measure Component Demand, as in the example described above. Mapping set 42 defines one or more mappings 48 between source members 32 (in column 44) and target members 32 (in column 46). Although exemplary mapping set 42 maps target members 32 of component alias 40b (the target alias 40) to source members 32 of product alias 40a (the source alias 40), the present invention contemplates any suitable mapping sets 42 according to particular needs, whether to generate dependent demand data or any other appropriate data. In one embodiment, mappings 48 collectively define a many-to-many relationship between the source and target members 32. Mappings 48 involving members 32 of one or more aliases 40 are preferably valid and invariant within database 16 across all members 32 of other aliases 40.

In one embodiment, some or all of the mappings 48 may be independent of any hierarchical relationship that may exist between the source and target members 32 in a corresponding dimension 30, in this case product dimension 30. For example, mapping 48 relating dependent demand for 13 gb hard drives (target product) to the demand for 96 mb memory boards (source product) may contain hierarchically unrelated members 32. In an analogous manner, mapping 48 relating dependent demand for 13 gb hard drives (target product) to demand for 128 mb memory boards (source product) may contain hierarchically unrelated members 32. The ability of system 10 to readily generate dependent demand data (or data for other types of virtual data measures) for hierarchically unrelated members 32 provides an important technical advantage.

In one embodiment, server 14 receives one or more mappings 48 and associated mapping sets 42 from client 12 or a user associated with client 12 and stores mapping sets 42 in database 16 for use in providing cross-dimensional data access and computations. Mapping sets 42 may be stored in database 16 individually or in a batch mode. Server 14, database 16, or another component of system 10 may validate mapping sets 42 to ensure that the source and target members 32 are sufficiently defined in the appropriate dimensions 30. Client 12 or an associated user may use server 14 to update or otherwise modify one or more mapping sets 42 as appropriate.

In one embodiment, server 14 and database 16 cooperate to support a scripting language interpreter used to write scripts that rely on hooks associated with an object to invoke one or more methods of the interfaces of that object. In general, such scripts may provide more powerful control structures than a typical expression language and may be used to generate computational logic that cannot be readily expressed using an expression. Virtual data measure definitions may embed invocations of one or more scripts that have been written to execute in the OLAP environment of system 10.

The following grammar, which is supported in typical existing OLAP systems, may be used to define the expression syntax used for defining virtual data measures:

<Virtual Measure>::=<Virtual Measure Name>= <Expression>
    <Expression>::=<Expression><Binary Operator><Expression>
    <Expression>::=<Unary Operator><Expression>
    <Expression>::=<Conditional Expression>
    <Expression>::=(<Expression>)
    <Expression>::=<Data Measure>
    <Expression>::=<Virtual Measure>
    <Expression>::=<Script>
    <Expression>::=<Literal>
    <Conditional Expression>::= <Condition>:<Expression>;<Conditional Expression>
    <Conditional Expression>::=<Condition>:<Expression>
    <Condition>::=<Condition><Logical Operator><Condition>
    <Condition>::=<Expression><Relational Operator><Expression>
    <Condition>::=<Boolean Literal>

As indicated, the definition for a virtual data measure may contain one or more references to other virtual data measures, including self-references. Two or more virtual data measures may have circular references, which may be permitted during syntax check but need to be resolved when such virtual data measures are actually being evaluated. When a cell of a virtual data measure (for a specified member 32 of each alias 40 on which the virtual data measure depends) is evaluated, the cells of one or more other measures (data measures, virtual data measures, or both) are accessed and evaluated as needed. A cell may be flagged as being evaluated during the time it is being evaluated and may later be flagged as value assigned after the value for the cell has been assigned. If a cell flagged as being evaluated is encountered during virtual measure evaluation, database 16 may generate a suitable run-time error indicating a circular reference, since the evaluation of the cell flagged as being evaluated requires availability of itself. One or more values for a single virtual data measure may be computed in any suitable relative order according to particular needs.

It may be desirable to provide cross-dimensional access in database 16 with respect to a virtual data measure; that is, access to data for positions different than the position at which the virtual data measure is being evaluated. It may also be desirable to provide for dimensionality changes with respect to a virtual data measure; that is, use of data measures or virtual data measures that depend on aliases 40 different from the aliases 40 on which the virtual data measure depends. According to the present invention, the following additional syntax may be used to provide such additional functionality:

<Expression>::=<Bounded Term>
    <Bounded Term>::=Count[<Mapping>]
    <Bounded Term>::=<Aggregation Function> [<Mapping>]<Expression>
    <Bounded Term>::=[<Identity>]<Expression>
    <Mapping>::=<Mapping Name>:<Dimension Set>→<Dimension Set>

```
<Mapping>::=<Mapping Name>:<Dimension Set>
<Mapping>::=<Mapping Name>:|<Dimension set>|
<Identity>::=<Alias Name>→<Alias Name>
<Dimension Set>::=<Alias Name>*<Dimension Set>
<Dimension Set>::=<Alias Name>
```

Using this syntax, <Bounded Term> is an expression for which a subset of its dimensionality is bound. In other words, even though some of the data measures in the expression depend on a particular set of dimensions 30, the expression as a whole does not. <Mapping> provides a representation for providing positions within the bound dimensions 30 given positions within other dimensions 30, thus changing the dimensionality of the bounded term, as described more fully below. <Mapping Name> identifies the particular mapping 48 used in the virtual data measure definition. In general, the dimensionality of a particular expression (whether or not bounded by the mapping 48) is the union of the dimensionality of: (1) all bounded terms, and (2) all unbounded data measures within the expression.

For the bounded term:

<Aggregation Function>[<Mapping Name>:<Dimension Set>→<Dimension Set>]<Expression>, arbitrary (specified) mapping may be provided as follows:

Aggregation Function[Name:Source Set→Target Set] Expression.

In one embodiment, Target Set is a subset of the dimensionality of Expression; that is, the set of aliases 40 being mapped to is a subset of the aliases 40 upon which the expression depends. The intersection of Source Set and Target Set is null; that is, no aliases 40 being mapped to are also aliases 40 being mapped from. Dimensionality of the bounded term is the union of: (1) the dimensionality of Expression minus the dimensionality of Target Set, with (2) the dimensionality of Source Set. Aggregation Function is used when multiple members 32 of Target Set are mapped to one member 32 of Source Set. Count is used when the number of members 32 generated is desired.

To evaluate Expression, a way to generate zero or more members 32 of Target Set is needed for each member 32 of Source Set. A mapping set 42 that is defined on aliases 40 used in both Source Set and Target Set may be used to map intersections of Source Set to those of Target Set. For example, Sum[Component-to-Product:Component→Product] (Product Demand*Attach Rate)

provides one virtual data measure according to an arbitrary (specified) mapping. If the dimensionality of a Product Demand data measure is {product, geography, time}, and the dimensionality of Attach Rate data measure is {product, component, geography, time}, then the dimensionality of the bounded term is {component, geography, time}. If the mapping set 42 used for the Component-to-Product mapping 48 is as illustrated in FIG. 4, and given a component 700 MHz (CPU), this bounded term calculates the following:

Sum[Product Demand for Home (Desktop)*Attach Rate for Home (desktop) & 700 MHz (CPU), Product Demand for Student (Desktop)*Attach Rate for Student (desktop) & 700 MHz (CPU)]

since this mapping set 42 yields two members 32 of product alias 40a (Home (desktop) & Student (desktop)) given 700 MHz (CPU) member 32 of component alias 40b.

For the bounded term:

<Aggregation Function>[<Mapping Name>:<Dimension Set>]<Expression> relative mapping may be provided as follows:

Aggregation Function[Name:Alias Set]Expression.

In one embodiment, Alias Set is a part of the dimensionality of Expression; that is, the expression depends at least in part upon aliases 40 in Alias Set. The dimensionality of the bounded term is the same as that of the Expression. Aggregation Function is used when mapping 48 generates multiple members 32 of Alias Set given one member 32. Count is used when the number of members 32 so generated is desired.

In one embodiment, the mapping [Name:Alias Set] may be used when relative mapping between members 32 of a dimension 30 is to be defined. Such mapping may be defined using parents (member 32 related to another member 32 in an adjacent lower level of dimension 30), children (member 32 related to another member 32 in an adjacent higher level of dimension 30), siblings (member 32 related to another member 32 in the same level of dimension 30), lead (member 32 advanced relative to another member 32, for example, in time dimension 30), lag (member 32 delayed relative to another member 32, for example, in time dimension 30), or any other suitable relationship. For example, Sum[Parent:Product]Sales provides a virtual data measure according to a relative mapping. The dimensionality of the bounded term does not change. For example, and not by way of limitation, if dimensionality of a Sales data measure is {product, geography, time}, then dimensionality of the bounded term will similarly be {product, geography, time}. If the Parent mapping 48 designates a parent member 32 in a particular level 32 of product dimension 30, the bounded term results in data for that parent member 32 given a member 32 of a child level 32. For example, if the Parent mapping 48 designates "Components" member 32 in "Type" level 34, the bounded term results in the data for "Components" member 32 of "Type" level 34 given "Hard Drives"member 32 of "Category" level 34, given "Memory Boards" member 32 of "Category" level 34, or given "CPUs" member 32 of "Category" level 34. The bounded term returns zero, not applicable, or another suitable result when the given member 32 is not a child of "Type" level 34.

For the Bounded Term:

<Aggregation Function>[<Mapping name>:|<Dimension Set>|]<Expression>, absolute mapping may be provided as follows:

Aggregation Function [Name:|Alias Set|]Expression.

In one embodiment, Alias Set is a subset of the dimensionality of Expression; that is, the set of aliases 40 being mapped to is a subset of the aliases 40 on which the expression depends. Dimensionality of the bounded term equals the dimensionality of Expression minus the dimensionality of Alias Set. Aggregation Function is used when mapping set 42 associated with Alias Set has multiple members 32. Count is used when the number of members 32 of mapping set 42 is desired.

In one embodiment, the mapping [Name:|AliasSet|] may be used when the same positions within one or more dimensions 30 are to be used irrespective of where the virtual data measure is being computed. Mapping set 42 on the same aliases 40 as in AliasSet is used to specify members 32 of Alias Set. For example, Sum[First Quarter:|Time|]Sales provides a virtual data measure according to an absolute mapping. If the Sales data measure has the dimensionality of {product, geography, time}, and mapping set 42 used to map is as follows:

January
February
March then the bounded term has the dimensionality of {product, geography}. The bounded term results in the first quarter sales given specified members 32 of the product and geography aliases 40.

[<Alias Name>→<Alias Name>]<Expression>, identity mapping may be provided as follows:

[Alias1→Alias2]Expression.

In a particular embodiment, Alias2 alias 40 is part of the dimensionality of the Expression; that is, the Expression depends on Alias2 alias 40, which is bound. Alias1 alias 40 and Alias2 alias 40 are, preferably, two different aliases 40 of the same dimension 30. The dimensionality of the bounded term is the union of: (1) dimensionality of Expression minus dimensionality of Alias1 alias 40, with (2) dimensionality of Alias2 alias 40.

The mapping [Alias1→Alias2] is used to represent identity mapping in which each member 32 of Alias1 alias 40 maps to the same member 32 of Alias2 alias 40 (Alias1 alias 40 and Alias2 alias 40 are two different aliases 40 of the same dimension 30). This may be desirable when the name of an alias 40 in the dimensionality of a member 32 needs to be changed or the same position in a dimension 30 needs to be used for two different aliases 40 of that dimension 30. For example,

[Component→Product]Component Units provides a virtual data measure according to an identity mapping. If dimensionality of Component Units data measure is {product, component, geography}, and the Component Units data measure contains the total number of components sold as part of a particular product, then the dimensionality of the bounded term is {component, geography} and the virtual measure provides the independent demand for components (the total number of components sold as part of the particular product).

In one embodiment, in addition to tasks such as statistical modeling, profit or other financial computations, and any other relatively straightforward computations, virtual data measures as described above may be used for a variety of sophisticated demand-related and other supply chain planning computations. Exemplary such computations include, without limitation: (1) historical substitutions—using history of one or more existing products to provide forecast data for a new product having less (possibly zero) history of its own; (2) ancestor lookups—using suitable data of a parent member 32 to compare with data of the current member 32, for example, computing a percentage of sales of "Desktop" member 32 that are also sales of "Home" member 32; (3) dependent demand computations—computing the demand for a component given the demand for products that incorporate the component and the attach rates for the component with respect to the products; (4) data dimensionality changes—changing dimensionality of syndicated or other data to be compatible with a desired dimensionality, for example, dimensionality required at a customer installation; and (5) any other suitable computations. While system 10 is described primarily in connection with demand-related computations, the present invention contemplates using virtual data measures to accomplish any suitable computations or other tasks in an OLAP environment. Those skilled in the art will appreciate that the present invention encompasses all such scenarios.

Historical substitution data may be computed as follows:

Max[Historical Substitution:Product→Substitute Product][Substitute Product→Product]Sales, where the dimensionality of a Sales data measure is Product, and Product and Substitute Product are aliases 40 of product dimension 30. Using the following mapping set 42 to relate members 32 within these aliases 40:

| Product | Substitute Product |
|---------|--------------------|
| P1      | P2                 |
| P1      | P3                 |
| ...     | ...                | for the mapping Historical Substitution, the bounded term results in the maximum of Sales for P2 and Sales for P3 being substituted for P1.

Ancestor lookup data may be computed as follows:

Sales/Sum[Parent:Product]Sales*100.

For example, if "Desktops" member 32 in "Category" level 34 is used for the Parent mapping 48, then the bounded term results in the percentage of the Sales data measure for "Desktops" member 32 that is also associated with the Sales data measure for the specified product, considering all child members 32 of "Desktops" member 32.

Dependent demand data may be computed as follows:

Sum[Component-to-Product:Component→Product]
   (Product Demand*Attach Rate),
   where the dimensionality of (Product Demand*Rate) is {product}. If the mapping set 42 used for Component-to-Product mapping 48 is as illustrated in FIG. 5, and given a component 700 MHz (CPU), then the bounded term will result in the dependent component demand for 700 MHZ (CPU) given the product demands for Home (desktop) and Student (desktop). Analogous dependent data may be computed for available supply, selling price, or any other data associated with a target product as a function of available supply, selling price, or other data, respectively, associated with one or more source products, according to particular needs.

For data dimensionality changes,

Sum[CoverageMapping:OurProduct*OurGeography*
   OurTime→Geography*Product*Time]
   (Coverage*DataMeasure)

takes the DataMeasure received from or otherwise associated with a third party data source and uses Coverage and CoverageMapping to convert the dimensionality of that third party data measure to the internal dimensionality of {ourproduct, ourgeography, ourtime}. Those skilled in the art will appreciate that the above are merely exemplary uses of virtual data measures to provide desired functionality according to the present invention. The present invention is intended to encompass all suitable scenarios falling within the scope of the claims provided below.

FIG. 6 is a flow chart illustrating an exemplary method of providing cross-dimensional computations and data access. The method begins at step 100, where client 12 and server 14 cooperate to define one or more dimensions 30 and dimension members 32 within database 16. Client 12 and server 14 cooperate to define one or more appropriate aliases 34 for each dimension 30 at step 102 and, at step 104, cooperate to define one or more suitable mapping sets 42 and associated mappings 48 between members 32 of aliases 34. Server 14 stores mapping sets 42 and associated mappings 48 in database 16 at step 106. Similarly, client 12 and server 14 cooperate to define and store one or more appropriate aggregation functions at step 108, one or more expressions for generating values for virtual data measures at step 110, and appropriate data measure instances at step 112. The present invention contemplates defining and storing the above information in any suitable relative order according to particular needs. When database 16 has been sufficiently configured to support cross-dimensional computation and data access according to the present invention, server 14 and database 16 cooperate at step 114 to provide such computation and access according to mappings 48 between dimension aliases 34, as specified in expressions for virtual data measures, and the method ends.

Although the present invention has been described with several embodiments, a plethora of changes, substitutions, variations, alterations, and other modifications may be suggested to one skilled in the art, and it is intended that the present invention encompass such changes, substitutions, variations, alterations, and modifications as fall within the spirit and scope of the appended claims.

What is claimed is:

1. A system for generating a value for a first attribute, comprising:
    a database having one or more dimensions each comprising one or more members, the database comprising one or more storage locations that are each associated with one member from each dimension in a set of one or more of the dimensions; and
    a server operable to evaluate an expression comprising at least one second attribute that depends on a set of one or more of the dimensions, the expression mapping at least one member of a first dimension on which the first attribute depends to at least one member of a second dimension on which the second attribute depends, the value for the first attribute being generated according to the expression.

2. The system of claim 1, wherein the server and database operate in an on-line analytical processing (OLAP) environment.

3. The system of claim 1, wherein the first and second dimensions are aliases of at least one base dimension.

4. The system of claim 1, wherein the first attribute does not depend on the second dimension.

5. The system of claim 1, wherein the value for the first attribute is generated using cross-dimensional computation according to the mapping.

6. The system of claim 5, wherein the computation is selected from the group consisting of:
    a historical substitution computation;
    an ancestor look-up computation; and
    a dependent data computation.

7. The system of claim 1, wherein a value for the second attribute is generated using cross-dimensional data access according to the mapping.

8. The system of claim 1, wherein the server is operable to communicate to the database a mapping set comprising a plurality of mappings.

9. The system of claim 1, wherein the mapping is an arbitrary mapping between one or more specified members of the first dimension and one or more specified members of the second dimension.

10. The system of claim 1, wherein the first dimension and the second dimension are the same dimension and the mapping is a relative mapping between related members of that dimension.

11. The system of claim 1, wherein the mapping is an absolute mapping between at least one member of the second dimension and all members of the first dimension, such that the member of the second dimension is mapped to irrespective of which member of the first dimension is selected.

12. The system of claim 1, wherein the first and second dimensions are aliases of the same base dimension and the mapping is an identity mapping between the member of the first dimension and the same member of the second dimension.

13. The system of claim 1, wherein the expression comprises multiple mapping sets between multiple sets of dimensions according to multiple mappings, each mapping being one of:
    an arbitrary mapping;
    a relative mapping;
    an absolute mapping; and
    an identity mapping.

14. The system of claim 1, wherein the expression comprises an aggregation function over a plurality of mapped members of the second dimension, the value for the first attribute being generated according to the aggregation function.

15. The system of claim 1, wherein the expression maps multiple members of multiple dimensions on which the first attribute depends to multiple members of multiple dimensions on which the second attribute depends.

16. The system of claim 1, wherein the second attribute has an associated storage location in the database but the first attribute does not.

17. A method of generating a value for a first attribute, comprising:
    evaluating an expression comprising at least one second attribute that depends on a set of one or more dimensions of a database that each comprise one or more members, the expression mapping at least one member of a first dimension on which the first attribute depends to at least one member of a second dimension on which the second attribute depends; and
    generating the value for the first attribute according to the expression.

18. The method of claim 17, wherein the method is performed in an on-line analytical processing (OLAP) environment.

19. The method of claim 17, wherein the first and second dimensions are aliases of at least one base dimension.

20. The method of claim 17, wherein the first attribute does not depend on the second dimension.

21. The method of claim 17, wherein the value for the first attribute is generated using cross-dimensional computation according to the mapping.

22. The method of claim 21, wherein the computation is selected from the group consisting of:
    a historical substitution computation;
    an ancestor look-up computation; and
    a dependent data computation.

23. The method of claim 17, further comprising generating a value for the second attribute using cross-dimensional data access according to the mapping.

24. The method of claim 17, further comprising communicating to the database a mapping set comprising a plurality of mappings.

25. The method of claim 17, wherein the mapping is an arbitrary mapping between one or more specified members of the first dimension and one or more specified members of the second dimension.

26. The method of claim 17, wherein the first and second dimensions are the same dimension and the mapping is a relative mapping between related members of that dimension.

27. The method of claim 17, wherein the mapping is an absolute mapping between at least one member of the second dimension and all members of the first dimension, such that the member of the second dimension is mapped to irrespective of which member of the first dimension is selected.

28. The method of claim 17, wherein the first and second dimensions are aliases of the same base dimension and the mapping is an identity mapping between the member of the first dimension and the same member of the second dimension.

29. The method of claim 17, wherein the expression comprises multiple mapping sets between multiple sets of dimensions according to multiple mappings, each mapping being one of:
an arbitrary mapping;
a relative mapping;
an absolute mapping; and
an identity mapping.

30. The method of claim 17, wherein the expression comprises an aggregation function over a plurality of mapped members of the second dimension, the value for the first attribute being generated according to the aggregation function.

31. The method of claim 17, wherein the expression maps multiple members of multiple dimensions on which the first attribute depends to multiple members of multiple dimensions on which the second attribute depends.

32. The method of claim 17, wherein the second attribute has an associated storage location in the database but the first attribute does not.

33. An expression for generating a value for a first attribute, the expression being stored in a computer-readable medium, the expression comprising:
at least one second attribute that depends on a set of one or more dimensions of a database, each dimension having one or more members; and
a mapping for mapping at least one member of a first dimension on which the first attribute depends to at least one member of a second dimension on which the second attribute depends.

34. The expression of claim 33, wherein the expression is suitable for use in an on-line analytical processing (OLAP) environment.

35. The expression of claim 33, wherein the first and second dimensions being aliases of at least one base dimension.

36. The expression of claim 33, wherein the first attribute does not depend on the second dimension.

37. The expression of claim 33, wherein the mapping is an arbitrary mapping between one or more specified members of the first dimension and one or more specified members of the second dimension.

38. The expression of claim 33, wherein the first dimension and the second dimension are the same dimension and the mapping is a relative mapping between related members of that dimension.

39. The expression of claim 33, wherein the mapping is an absolute mapping between at least one member of the second dimension and all members of the first dimension, such that the member of the second dimension is mapped to irrespective of which member of the first dimension is selected.

40. The expression of claim 33, wherein the first and second dimensions are aliases of the same base dimension and the mapping is an identity mapping between the member of the first dimension and the same member of the second dimension.

41. The expression of claim 33, wherein the expression comprises multiple mapping sets between multiple sets of dimensions according to multiple mappings, each mapping being one of:
an arbitrary mapping;
a relative mapping;
an absolute mapping; and
an identity mapping.

42. The expression of claim 33, wherein the expression comprises an aggregation function over a plurality of mapped members of the second dimension, the value for the first attribute being generated according to the aggregation function.

43. The expression of claim 33, wherein the expression maps multiple members of multiple dimensions on which the first attribute depends to multiple members of multiple dimensions on which the second attribute depends.

44. Software for generating a value for a first attribute, the software being embodied in computer readable media and when executed operable to:
evaluate an expression comprising at least one second attribute that depends on a set of one or more dimensions of a database that each comprise one or more members, the expression mapping at least one member of a first dimension on which the first attribute depends to at least one member of a second dimension on which the second attribute depends; and
generate the value for the first attribute according to the expression.

45. The software of claim 44, wherein the software is executed in an on-line analytical processing (OLAP) environment.

46. The software of claim 44, wherein the first and second dimensions are aliases of at least one base dimension.

47. The software of claim 44, wherein the first attribute does not depend on the second dimension.

48. The software of claim 44, wherein the value for the first attribute is generated using cross-dimensional computation according to the mapping.

49. The software of claim 48, wherein the computation is selected from the group consisting of:
a historical substitution computation;
an ancestor look-up computation; and
a dependent data computation.

50. The software of claim 44, further operable to generate a value for the second attribute using cross-dimensional data access according to the mapping.

51. The software of claim 44, further operable to communicate to the database a mapping set comprising a plurality of mappings.

52. The software of claim 44, wherein the mapping is an arbitrary mapping between one or more specified members of the first dimension and one or more specified members of the second dimension.

53. The software of claim 44, wherein the first and second dimensions are the same dimension and the mapping is a relative mapping between related members of that dimension.

54. The software of claim 44, wherein the mapping is an absolute mapping between at least one member of the second dimension and all members of the first dimension, such that the member of the second dimension is mapped to irrespective of which member of the first dimension is selected.

55. The software of claim 44, wherein the first and second dimensions are aliases of the same base dimension and the mapping is an identity mapping between the member of the first dimension and the same member of the second dimension.

56. The software of claim 44, wherein the expression comprises multiple mapping sets between multiple sets of dimensions according to multiple mappings, each mapping being one of:

an arbitrary mapping;

a relative mapping;

an absolute mapping; and an identity mapping.

57. The software of claim 44, wherein the expression comprises an aggregation function over a plurality of mapped members of the second dimension, the value for the first attribute being generated according to the aggregation function.

58. The software of claim 44, wherein the expression maps multiple members of multiple dimensions on which the first attribute depends to multiple members of multiple dimensions on which the second attribute depends.

59. The software of claim 44, wherein the second attribute has an associated storage location in the database but the first attribute does not.

* * * * *